United States Patent
Sutton et al.

(10) Patent No.: US 8,562,711 B2
(45) Date of Patent: Oct. 22, 2013

(54) ADDITIVE CONTAINING N-(N-BUTYL)THIOPHSPHORIC TRIAMIDE FOR UREA-BASED FERTILIZER

(75) Inventors: Allen R. Sutton, Corydon, KY (US); Willis Thornsberry, Sturgis, KY (US)

(73) Assignee: Koch Agronomic Services, LLC, Wichita, KS (US)

( * ) Notice: Subject to any disclaimer, the term of this patent is extended or adjusted under 35 U.S.C. 154(b) by 470 days.

(21) Appl. No.: 11/652,773

(22) Filed: Jan. 12, 2007

(65) Prior Publication Data

US 2007/0157689 A1 Jul. 12, 2007

Related U.S. Application Data

(60) Provisional application No. 60/758,594, filed on Jan. 12, 2006.

(51) Int. Cl.
*C05C 9/00* (2006.01)
(52) U.S. Cl.
USPC .................. 71/28; 71/29; 71/30; 71/55; 71/62
(58) Field of Classification Search
USPC .................................. 71/27–30, 55, 62, 64.03
See application file for complete search history.

(56) References Cited

U.S. PATENT DOCUMENTS

| | | | |
|---|---|---|---|
| 3,112,343 A | 11/1963 | Allgener et al. | |
| 3,931,063 A | 1/1976 | Renner | |
| 3,953,421 A | 4/1976 | Berstein | |
| 3,981,845 A | 9/1976 | Renner | |
| 3,988,522 A | 10/1976 | Berstein | |
| 4,018,741 A | 4/1977 | Renner | |
| 4,025,329 A | 5/1977 | Goertz | |
| 4,101,521 A | 7/1978 | Renner | |
| 4,160,782 A | 7/1979 | Van Hijfte et al. | |
| 4,219,589 A | 8/1980 | Niks et al. | |
| 4,367,171 A | 1/1983 | Leifels et al. | |
| 4,431,213 A | 2/1984 | Hofer et al. | |
| 4,517,003 A * | 5/1985 | Kolc et al. | 71/28 |
| 4,530,714 A * | 7/1985 | Kolc et al. | 71/28 |
| 4,551,166 A | 11/1985 | Behnke et al. | |
| 5,238,480 A | 8/1993 | Rehberg et al. | |
| 5,352,265 A * | 10/1994 | Weston et al. | 71/29 |
| 5,364,438 A | 11/1994 | Weston et al. | |
| 5,698,003 A * | 12/1997 | Omilinsky et al. | 71/28 |
| 6,217,630 B1 | 4/2001 | Chanen et al. | |
| 6,380,135 B1 * | 4/2002 | Reuter et al. | 504/366 |
| 6,656,883 B1 | 12/2003 | Vogt et al. | |
| 6,890,888 B2 | 5/2005 | Pursell et al. | |
| 6,936,681 B1 | 8/2005 | Wertz et al. | |
| 2003/0022959 A1 | 1/2003 | Blount | |
| 2003/0154754 A1 | 8/2003 | Costa et al. | |
| 2006/0003893 A1 | 1/2006 | Pursell et al. | |

FOREIGN PATENT DOCUMENTS

| | | |
|---|---|---|
| EP | 1 464 635 A | 10/2004 |
| EP | 1 820 788 A1 | 8/2007 |
| GB | 897 067 A | 5/1962 |
| SU | 494 379 A1 | 12/1975 |
| WO | WO 00/61522 A1 | 10/2000 |
| WO | WO 03/082005 A2 | 10/2003 |
| WO | WO 2005/107454 A | 11/2005 |
| WO | WO 2007/117786 A2 | 10/2007 |
| WO | WO 2008/002503 A2 | 1/2008 |

OTHER PUBLICATIONS

Manual of Fertilizer Processing, 1987, Ed. Francis T. Nielsson, Marcel Dekker, Inc., New York and Basel.
Pergopak® Material Safety Data Sheet; Product Label Name: Pergopak M, Pergopak M3, Pergopak M4, Pergopak M2, Pergopak M5, Pergopak M6, Pergopak Hp, Pergopak Fc; Company Identification: Albemarle Martinswerk GmbH; Issue: Aug. 4, 2008; 5 pages.
Elekeiroz Material Safety Data Sheet; Product: Urea Formaldehyde Concentrate; Issue: Jan. 23, 2002; Revision: Jul. 25, 2008; 8 pages.
Deuteron® Material Safety Data Sheet; Product Trade Name: Pergopak M3; Manufacturer/Supplier: Albemarle Martinswerk GmbH; Reviewed on: Feb. 19, 2009; 4 pages.
Borden Chemical Material Safety Data Sheet; Casco® UF 85 Concentrate; Manufacturer/Supplier: Borden Chemical, Inc.; Issue: Sep. 30, 2004; 7 pages.
Barmac Industries Pty Ltd Material Safety Data Sheet; Barmac Ureaform; Issue: Mar. 15, 2004; 4 pages.
Insol-U-25® and Sta-Form 60® UFC, Urea Formaldehyde Concentrate Product Information, Georgia-Pacific Resins, Inc., Aug. 2006, 3 pages.
Sta-Form 60® 5326, Urea Formaldehyde Concentrate Product Literature, Georgia-Pacific Chemical, printed Apr. 7, 2010, 1 page.
Export Products—Urea Formaldehyde Concentrate (UF 80) / (UF 85).

* cited by examiner

*Primary Examiner* — Kaj K Olsen
*Assistant Examiner* — Pritesh Darji
(74) *Attorney, Agent, or Firm* — Kilpatrick Townsend & Stockton

(57) ABSTRACT

A dry flowable additive for aqueous urea-based fertilizers made of solid urea formaldehyde polymer (UFP), N-(n-butyl) thiophosphoric triamide (NBPT), and, optionally, dicyandiamide (DCD), wherein the liquid fertilizer containing the additive provides reduced nitrogen loss from the soil. Optionally, the dry additive may also be blended with molten or solid urea to form a solid urea-based fertilizer with reduced nitrogen loss from the soil.

11 Claims, No Drawings

ADDITIVE CONTAINING N-(N-BUTYL)THIOPHSPHORIC TRIAMIDE FOR UREA-BASED FERTILIZER

FIELD OF THE INVENTION

The field of the invention is urea-containing fertilizers. More specifically, this invention discloses a dry, flowable additive containing N-(n-butyl) thiophosphoric triamide (NBPT), solid urea-formaldehyde polymer (UFP), and, optionally, dicyandiamide (DCD) which can be combined with a urea-based fertilizer to prepare a fertilizer which provides reduced nitrogen loss from the soil.

BACKGROUND OF THE INVENTION

Nitrogen is an important plant nutrient. In addition to phosphorous, potassium, and other nutrients, nitrogen is needed to support the growth and development of plant life. Some plants, such as legumes, through a symbiotic relationship with *Rhizobium* bacteria, fix elemental nitrogen from the atmosphere and fix this nitrogen into the soil. However, most plants grown to produce human and animal food require the use of nitrogen fertilizer in order to sustain their agricultural production.

The most widely used and agriculturally important high-analysis nitrogen fertilizer is urea, $CO(NH_2)_2$. While most of the urea currently produced is used as a fertilizer in its granular form, urea-based fluid fertilizers are also well known. As used herein, the term "fluid fertilizers" encompasses liquid fertilizers, i.e. aqueous solutions of fertilizers, and suspension fertilizers, i.e. fertilizer compositions which in addition to water and water-soluble components also contain insoluble components kept in suspension by a suspending agent, such as clay. Suspension fertilizers are excellent carriers for pesticides and micronutrients.

The most commonly known urea-based liquid fertilizer is an aqueous solution of urea and ammonium nitrate, referred to in the fertilizer trade as UAN solution. These fluid fertilizers are used on a variety of crops, such as corn and wheat. When applied to moist soil, the urea component of the fluid fertilizer becomes a source of ammonia as a result of hydrolysis catalyzed by urease, an enzyme produced by numerous fungi and bacteria. The process is fully disclosed in U.S. Pat. No. 5,364,438, which is hereby incorporated by reference. Unfortunately, the urease-catalyzed hydrolysis often converts the urea to ammonia more quickly than it can be absorbed by the soil, resulting in undesirable ammonia loss to the atmosphere through a process called volatilization.

Urease inhibitors slow down the conversion of urea to ammonia, extending the period of nitrogen release. One urease inhibitor is N-(n-butyl) thiophosphoric triamide (NBPT). When incorporated into a urea-based fertilizer, NBPT reduces the rate at which urea is hydrolyzed to ammonia. This allows the nutrient nitrogen to be available to the soil and plants over a longer period of time. NBPT is widely recognized as an effective urease inhibitor, but NBPT is notoriously difficult to handle, because industrial grade NBPT is a waxy, sticky, heat-sensitive and water-sensitive material. As a result, a solvent system was disclosed in U.S. Pat. No. 5,364,438, that allowed the solution of NBPT to be applied to UAN. However, this solution had stability problems as well as problems in delivering and metering into fluid fertilizer.

U.S. Pat. No. 5,352,265, which is hereby incorporated by reference, discloses a granular fertilizer comprising about 90 to 99% urea, 0.02 to 0.5% NBPT and about 0 to 2.2% DCD. The NBPT is added to molten urea as a concentrated solution in an amide solvent. The DCD is added to the urea melt as a solid. This granular product is made to apply directly to the field crop.

The present invention of a dry flowable additive, is prepared by coating a solid urea-formaldehyde polymer (UFP) with a solution or suspension of NBPT in a liquid solvent, preferably an amide solvent. Optionally, the coated UFP may be blended with solid DCD. Prior to application of the fertilizer to the field crop, the dry flowable additive is blended with a UAN solution or aqueous urea, to form the fluid urea-containing fertilizer composition, or blended with solid or molten urea to form a solid urea-based fertilizer. The present invention provides a fluid or solid fertilizer composition that is easy to handle and stable when stored.

SUMMARY OF THE INVENTION

All percentages are by weight, unless otherwise indicated. The present invention is a fluid fertilizer composition, comprising an aqueous solution of UAN or urea, NBPT and, optionally, DCD. A dry flowable additive for the UAN or aqueous urea is prepared by coating a solid UFP with a solution or suspension of NBPT in a liquid solvent. The NBPT is present in the dry additive in the amount of about 0.40 to 15.0%. The solid UFP is present in the range of about 3.0 to 15.0%. Optionally, solid DCD can be blended with this coated UFP in the range of 40.0 to 95.0%, and silicon dioxide in the range of from about 0 to 3%. Prior to applying the UAN or urea, the dry additive is blended with aqueous UAN or urea in the range of about 0.4 to 2.5% additive to form the fluid urea-containing fertilizer composition. Alternatively, the dry flowable additive may also be added to molten urea or solid urea and granulated to provide a dry fertilizer. The composition of the present invention may be applied to a field crop to minimize the undesired loss of ammonia nitrogen from surface-applied urea and nitrogen loss in the soil due to leaching and denitrification of nitrate nitrogen.

DETAILED DESCRIPTION OF THE INVENTION

The term NBPT as used throughout this specification refers not only to N-(n-butyl) thiophosphoric triamide in its pure form, but also to industrial grades or other grades of the material which may contain up to 50% impurities. The preferred NBPT is at least 50% pure, the most preferred NBPT is greater than 50% pure, in the range of about 51 to 90% pure. The NBPT is present in the dry flowable additive in the range of about 0.4 to 15.0%.

A NBPT solution or suspension in an amide solvent, such as N-alkyl 2-pyrrolidone, is used to prepare the dry flowable additive of the present invention. The solution or suspension contains between about 30% and about 80% NBPT, and preferably between about 50% and about 75% NBPT. The NBPT solution may be prepared by dissolving or suspending NBPT in a solvent selected from a group of liquid amides such as an N-alkyl 2-pyrrolidone, or by adding the N-alkyl 2-pyrrolidone into the NBPT production system in order to produce an NBPT solution, rather than recover a waxy NBPT solid. Alternatively, molten NBPT, without additional solvents, may be used to coat the UFP in the present invention.

The solid UFP of the present invention is preferably a polymethyl urea resin with approximately 0.6% reactive methylol groups. It has primary particles of 0.1 to 0.15 µm, forming agglomerates of 3.5 to 6.5 µm diameter on average. The preferred solid UFP is marketed as PERGOPAK M® 2, a trademark of Albemarle Corporation. The solid UFP is present in the dry flowable additive in the range of about 3 to 15%. The most preferred solid UFP is PERGOPAK M® 2 product or the unrefined pre-cursor to PERGOPAK M® 2.

The optional DCD of the present invention has preferably a particle range from about 50 to 350 μm. The DCD is present in the dry flowable additive in the range of about 40 to 95%. In a further embodiment of the invention, the dry flowable additive may contain from about 1.0 to 30.0% solid UFP and from about 99.0 to 70.0% DCD.

The balance of the composition consists primarily of water, and an N-alkyl pyrrolidone may also be present in small quantities. The composition may optionally also contain a suspending agent, such as clay, as well as other additives, such as a herbicide, a dye, an NBPT stabilizer, or a micronutrient. Silicon dioxide, a flow agent, is optionally present in an amount of up to about 3% of the dry flowable additive.

The dry, flowable additive prepared without the optional DCD contains about 1 to 80% NBPT and about 99 to 20% solid UFP.

The dry flowable additive is added to the UAN solution, aqueous urea, or solid or molten urea, in the range of about 0.1 to 5.0% additive in the final product. Preferably, the dry flowable additive is added in the range of about 0.4 to 2.5% to fluid UAN or urea solution, or blends thereof, to form a fluid fertilizer. The fluid urea-based fertilizer of the present invention contains from about 0.004 to 1.50% NBPT, from about 0.040 to 0.850% DCD, from about 0.030 to about 0.30% UFP, and from about 99.9 to 98.0% aqueous UAN. Optionally, the fertilizer can contain up to about 0.03% silicon dioxide. The aqueous UAN contains urea and ammonium nitrate in concentration ranges of about 15 to 50%. A preferred range is from about 25 to 40%.

The UAN-based fluid fertilizer composition of this invention can be used in all agricultural applications in which UAN is currently used. These applications include a very wide range of crop and turf species, tillage systems, and fertilizer placement methods.

The following example is to illustrate the invention and is not present to limit the invention or claims in any manner.

EXAMPLE

The Example is a laboratory preparation of a dry flowable additive composition.

200 grams of 50% NBPT solution in N-alkyl 2-pyrrolidone was added to 73.4 grams of solid UFP (PERGOPAK M® 2) and 0.5 grams of a blue dye (FD & C blue #1). The mixture was blended until a uniform mix was achieved as indicated by the distribution of the blue color. This mixture was blended with 1270 grams DCD and further blended to a uniform color to form the dry flowable additive.

TABLE 1

Composition of Example 1

| Component | Mass (g) | % Component |
|---|---|---|
| 50% NBPT solution | 200.0 | 12.95 (6.47% NBPT) |
| Solid UFP | 73.4 | 4.75 |
| Blue dye | 0.50 | 0.03 |
| DCD | 1270.0 | 82.27 |
| Total | 1543.9 | 100.0 |

The dry flowable additive prepared in Example 1 was mixed with aqueous UAN to form a fluid urea-based fertilizer and tested for efficacy as an inhibitor of ammonia volatilization using test methods known to those skilled in the art of volatilization testing. A control sample did not contain NBPT, and the three samples of the invention had NBPT at levels of 0.013%, 0.026% and 0.051% respectively in the final fluid UAN fertilizer composition. It was found that the presence of NBPT was effective in reducing ammonia loss, particularly at the 0.026% and 0.051% levels when compared with fluid UAN fertilizer without NBPT (the control).

The invention claimed is:

1. An additive for a urea containing fertilizer comprising:
    a. NBPT in the range of about 0.40 to 15.0%;
    b. DCD in the range of about 40 to 95%;
    c. Silicon dioxide in the range of about 0 to 3%; and
    d. Solid polymethyl urea resin in the range of about 3 to 15%,
wherein the polymethyl urea resin is an agglomeration of primary particles with a diameter of from about 0.1 to 0.15 micrometers, wherein the agglomeration is from about 3.5 to 6.5 micrometers on average, and wherein the additive is a dry, flowable solid.

2. The additive of claim 1 blended with an aqueous urea solution to form a fluid fertilizer.

3. A method of preparing an additive for a molten urea, manure, solubilized urea, granulated solid urea, or UAN-based fluid fertilizer comprising:
    a. Coating a solid polymethyl urea resin with NBPT, wherein the NBPT is molten or in a suspension or solution;
    b. Adding DCD; and
    c. Optionally adding silicon dioxide; wherein the final ranges of the components are NBPT in the range of about 0.4 to 15%; DCD in the range of about 40 to 95%; silicon dioxide in the range of about 0 to 3%; and polymethyl urea resin in the range of about 3 to 15%, wherein the polymethyl urea resin is an agglomeration of primary particles with a diameter of from about 0.1 to 0.15 micrometers, wherein the agglomeration is from about 3.5 to 6.5 micrometers on average, and wherein the additive is a dry, flowable solid.

4. An additive comprising:
    a. from about 1.0 to 30% solid polymethyl urea resin, and
    b. from about 99.0 to 70% DCD%, wherein the polymethyl urea resin is an agglomeration of primary particles with a diameter of from about 0.1 to 0.15 micrometers, wherein the agglomeration is from about 3.5 to 6.5 micrometers on average, and wherein the additive is a dry, flowable solid.

5. The dry flowable additive of claim 1, wherein the additive is further blended with liquid or solid manure, waste or compost.

6. A method of preparing an additive for a UAN-based fluid fertilizer comprising:
    a. Coating a solid polymethyl urea resin with NBPT, wherein the NBPT is molten or in a suspension or solution;
    b. Blending DCD and polymethyl urea resin;
    c. Blending the polymethyl urea resin and NBPT together with the polymethyl urea resin and DCD; and
    d. Optionally adding silicon dioxide; wherein the final ranges of the components are NBPT in the range of about 0.4 to 15%; DCD in the range of about 40 to 95%; silicon dioxide in the range of about 0 to 3%; and polymethyl urea resin in the range of about 3 to 15%, wherein the polymethyl urea resin is an agglomeration of primary particles with a diameter of from about 0.1 to 0.15 micrometers. wherein the agglomeration is from about 3.5 to 6.5 micrometers on average, and wherein the additive is a dry, flowable solid.

7. The additive of claim 1, wherein the NBPT is at least 50% pure.

8. The additive of claim 7, wherein the polymethyl urea resin is an unrefined polymethyl urea resin.

9. An additive for a urea containing fertilizer comprising:
   a. NBPT in the range of about 1 to 80%, and
   b. solid polymethyl urea resin in the range of about 99 to 20%, wherein the polymethyl urea resin is an agglomeration of primary particles with a diameter of from about 0.1 to 0.15 micrometers, wherein the agglomeration is from about 3.5 to 6.5 micrometers on average, and wherein the additive is a dry, flowable solid.

10. The additive of claim 9 wherein the composition includes DCD.

11. The additive of claim 9, wherein the additive is combined with a urea fertilizer source selected from the group consisting of molten urea, manure, UAN, solubilized urea and granulated solid urea.

* * * * *